United States Patent [19]

Freeman

[11] 4,350,417
[45] Sep. 21, 1982

[54] APPARATUS TO CONTROL LIGHT INTENSITY FROM ARC LAMP

[75] Inventor: Robert S. Freeman, Toledo, Ohio

[73] Assignee: Strong Electric Corporation, Toledo, Ohio

[21] Appl. No.: 241,287

[22] Filed: Mar. 6, 1981

[51] Int. Cl.³ .................... G05D 25/00; G03B 21/14; G03B 9/02

[52] U.S. Cl. .................................... 353/90; 352/198; 353/86; 353/93; 355/71; 362/321

[58] Field of Search .................. 362/321, 253; 353/85, 353/86, 88, 93, 119, 122, 90; 352/198, 203; 355/71

[56] References Cited

U.S. PATENT DOCUMENTS

| | | | |
|---|---|---|---|
| 941,752 | 11/1909 | Ashley | 353/90 |
| 3,469,145 | 9/1969 | Ralke et al. | 353/119 |
| 3,914,645 | 10/1975 | Donnici | 353/119 |
| 4,158,491 | 6/1979 | Demick et al. | 353/90 |

Primary Examiner—Steven L. Stephan
Attorney, Agent, or Firm—Blum, Kaplan, Friedman, Silberman & Beran

[57] ABSTRACT

An apparatus for controlling the light intensity output from an arc lamp for use with an arc lamp-illuminated projector includes a light valve to control the projector output light intensity by the selective positioning of the light valve in all or a portion of the light path between the arc lamp and the projector output. The light valve is operatively coupled to the output of a magnetically coupled clutch, the input of the clutch being continuously driven by a motor. A programmer applies a voltage proportional to the desired light intensity to the clutch for controlling the degree of magnetic coupling, and therefore the position of the light valve. The variable torque applied through the clutch to the light valve may be countered by a variable counter-torque produced as by a spring to establish the desired continuous range of equilibrium positions of the light valve.

13 Claims, 7 Drawing Figures

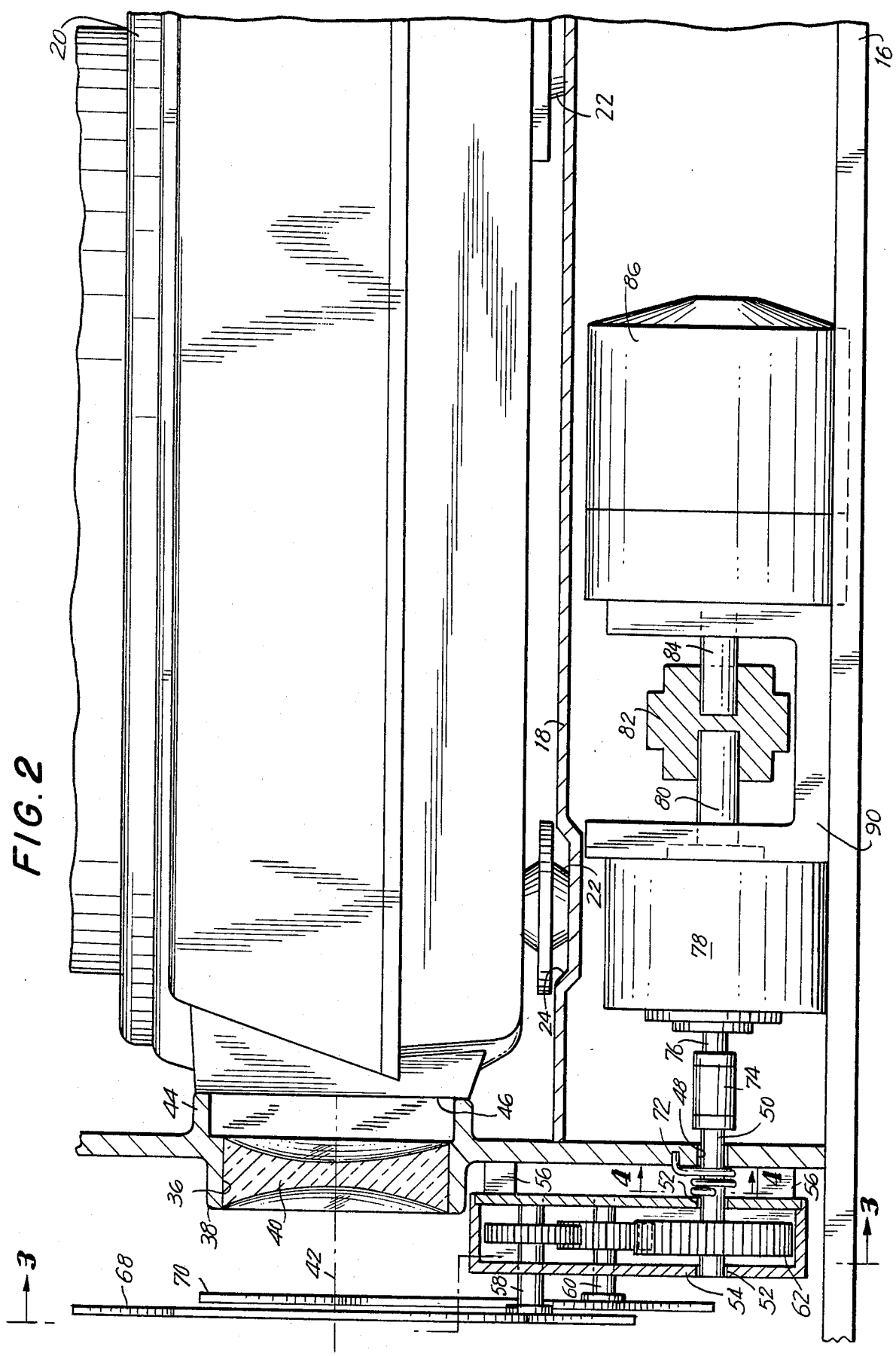

APPARATUS TO CONTROL LIGHT INTENSITY FROM ARC LAMP

BACKGROUND OF THE INVENTION

Generally speaking, this invention relates to slide or film projectors having an arc lamp light source, and more particularly to dissolver means for controlling the output light intensity of such projectors.

At the present time, it is known that a plurality of slide projectors may be used to produce an integrated slide or other film show on a single projection screen or on a plurality of screens. In the simplest example, two projectors may be directed to the same screen and may be timed to present slides alternately. Thus, when the first projector is on, its lamp is lighted and the image on a slide is projected onto the screen. When the time arrives for the second slide, the first projector is turned off, i.e. its lamp intensity is either greatly reduced or the light path blocked and the second is turned on, i.e. its lamp intensity is greatly increased or the light path is unblocked. A more complicated application is presented by the complex multiprojector and multi-media shows now being utilized in trade presentations and for entertainment. In such complex shows, a plurality of different, continuously changing images is projected on numerous screens or screen segments, by way of slide and/or movie film.

It is also known that the transition from one projector to another may either be done by a manually operated switch or by means of a program control system connected to the projectors. In use, these controllers allow the transition from one projector to another to be made gradually so that the light from the first gradually decreases while that from the second gradually increases. This type of control is known as a "dissolve" and the device controlling it is known as a "dissolver" or "dissolver controller". There are a number of such dissolver systems now available commercially and in addition to the control switching of projectors, they often incorporate many other features allowing the control of a variety of other projection and audio devices for the most complicated types of presentations. The more complex multi-media and multi-projector shows can only be controlled by such dissolver systems, many of which are computer-controlled.

A further complicating factor is the fact that incandescent lamp-illuminated projectors are only satisfactory for projection over small area screens. As a practical matter, arc lamp projectors must be utilized in very large halls such as theaters or where outdoor or daylight presentations must be made. Such arc lamp projectors cannot be controlled by direct voltage control of the lamp itself since a reduction in current supply to the lamp results in the extinguishing of the lamp. As a practical matter, the control of light intensity of such lamps can only be achieved through a mechanical light valve in the light path. Such light valves have taken the form of an iris, similar to that used in cameras or a set of shutters or flaps likewise adjustable to permit intensity control adjustment by adjusting the opening to pass more or less light according to the needs of the program. One such system is reflected in U.S. Pat. No. 4,158,491 in which an arc lamp projector has a light valve comprising a motor means linearly responsive to average power, for example, a moving iron galvanometer, and a moving means such as a louvre, positioned between the arc lamp and the film gate. In this system, the dissolver operates by phase control of an alternating current supplied to a current responsive motor device which is, in turn, connected by a set of linkages to a light interrupting system. The rotor of the motor has an angle of rotation linearly related to the average output power.

However, it has been found that this system is relatively complex. More desirable would be a system wherein the light valve orientation, and therefore the light intensity projected, were substantially directly proportional to an applied voltage since existing dissolver controllers produce such output voltages for control of audio and incandescent lamp projectors.

By providing a magnetically coupled clutch between a continuously driven motor and the light valve, by providing a source of variable counter-torque and by applying the control voltage to the clutch to control the magnetic coupling thereof, the desired light intensity control may be provided.

SUMMARY OF THE INVENTION

In accordance with the invention, an apparatus for controlling the light intensity output from an arc lamp is provided, including displaceable light valve means positionable in the light path intermediate said lamp and a projector output for the selective control of the intensity of the light passed to said output by the positioning of said light valve means; magnetically coupled clutch means having an output operatively coupled to said light valve means for controlling the positioning thereof and an input operatively coupled to a continuously rotating motor means; counter-torque means coupled to said magnetic clutch means output for resisting the rotation thereof and programmer means for selectively applying a control signal to said magnetic clutch means for the control of the magnetic coupling between said input and output thereof in response to the voltage of said control signal, whereby the light valve is positioned at a position representative of the voltage of the control signal, which position is representative of a balance between applied torque transmitted by magnetic clutch means and the counter-torque.

The magnetic clutch means may be a hysteresis clutch means having an essentially linear characteristic in the operative range whereby applied torque is linearly proportional to the voltage of the control signal. The counter-torque means may include a spring means coupled between the clutch means output and a fixed point. Said counter-torque means preferably provides a linear counter-torque.

The light valve means may consist of a pair of overlapping co-linked, counter-rotating blades positioned between the arc lamp and the lens system of the projector. Each of the valve means blades may have an arcuately sided notch cut into the inner side thereof so that said notch progressively widens to produce the desired variation in projected light intensity from no light being passed (an "off" position) to full lamp intensity projection. The motor means may be a simple AC or DC constant speed motor.

A plurality of projectors having the apparatus for controlling light intensity output of an arc lamp in accordance with the invention may be controlled by a single programmer. The projectors may take the form of any film projector including slide and movie film projectors.

Therefore, it is the primary object of the present invention to provide a dissolver system for use in a film projector having an arc lamp light source.

It is a further object of the present invention to provide a dissolver system for use in arc lamp illuminated slide projectors in which a torque controlled light valve is inserted into the projector, said valve being positioned between the arc lamp light source and lens subsystem so that the light intensity reaching the film may be accurately controlled under the direction of a dissolver.

It is still another object of the present invention to provide a dissolver system for use in arc lamp illuminated slide film projectors in which the light valve and its associated drive components are low in cost, simple to use and easy to install, said components being assembled into a system which will reliably operate in field use with a minimum of maintenance and upkeep.

It is yet another object of the present invention to provide a dissolver system for use in arc lamp illuminated projectors directly responsive to conventional output signals of existing programmable control means heretofore adapted for use with film projectors having incandescent lamp illumination.

Still other objects and advantages of the invention will in part be obvious and will in part be apparent from the specification and drawings.

The invention accordingly comprises features of construction, combinations of elements and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a partial side elevational view of the apparatus of FIG. 1 with portions broken away;

DESCRIPTION OF THE PREFERRED EMBODIMENTS

Figure 1:
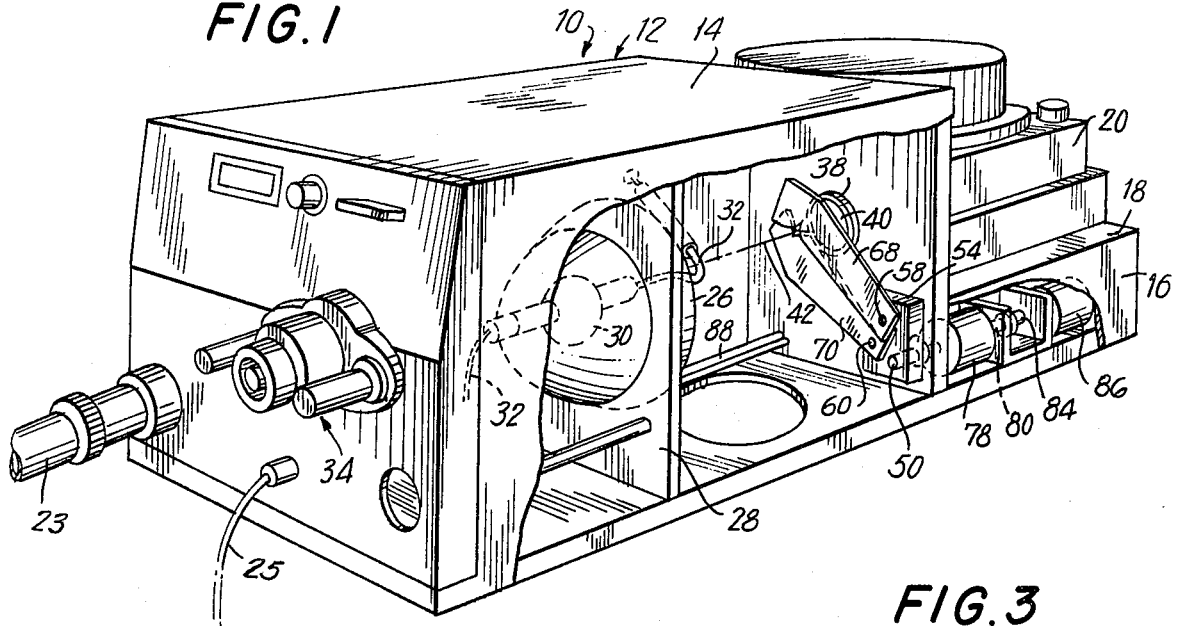
FIG. 1 is a perspective view of an arc lamp slide projector having the apparatus for controlling light intensity output from an arc lamp in accordance with the invention, with a portion of the housing wall thereof broken away.

Referring now to FIGS. 1 and 2, an arc lamp-illuminated slide projector assembly 10 embodying the apparatus for controlling the light intensity output from an arc lamp in accordance with the invention is depicted. Projector assembly 10 is provided with a cabinet 12 having a lamp housing portion 14 in the rear portion thereof and a substantially lower dissolve control portion 16 in the front thereof. Dissolve control portion 16 defines a shelf 18 which supports a conventional slide carousel projector 20 positioned with its optical system in registration with the optical system mounted within lamp housing portion, as more particularly described below. By way of example, slide projector 20 may be a Kodak 2×2 Ektagraphic arc slide projector provided with legs 22 received in recesses 24 in shelf 18, only one of which is shown, for aiding in the proper positioning of the projector 20.

Figure 3:
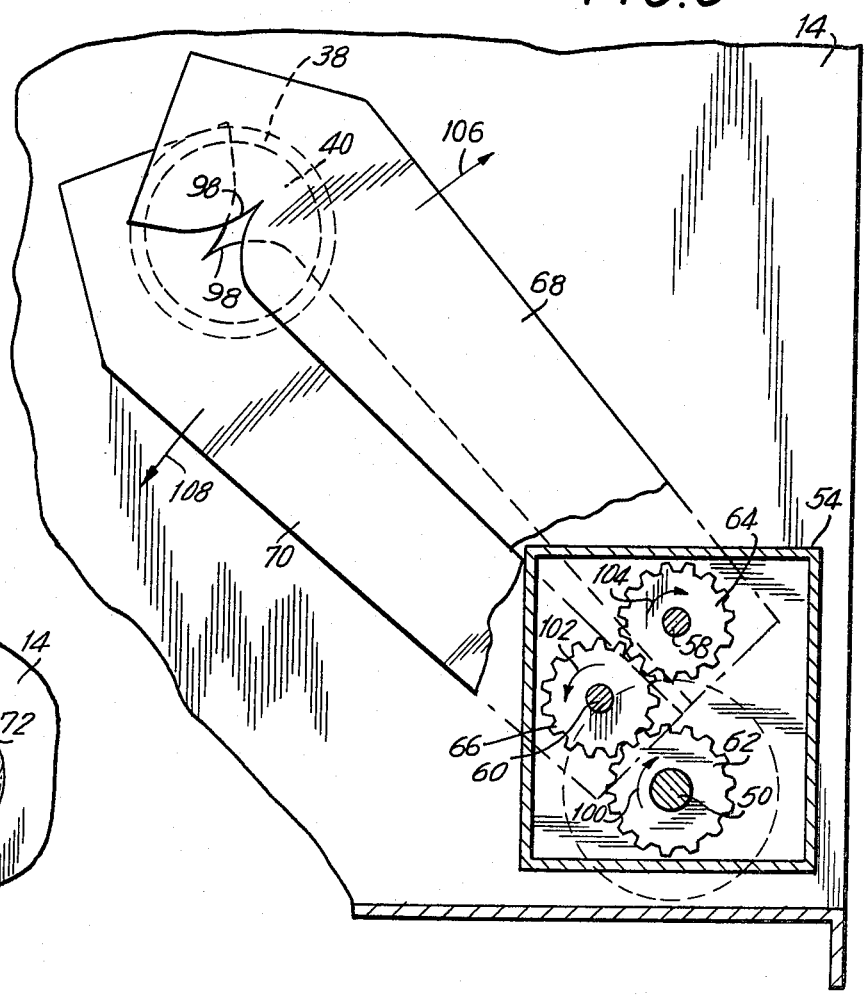
FIGS. 3 and 4 are enlarged sectional views taken along lines 3—3 and 4—4, respectively, of FIG. 2.

As more particularly seen in FIG. 1, power is provided to the projector assembly 10 by means of power line 23 while the dissolve control signal, as more particularly described below, is provided by line 25. Mounted within lamp housing portion 14 is a polished elliptical reflector 26 supported in an internal laterally extending wall 28. Supported within reflector 26 is an arc lamp 30, in this embodiment, of the xenon quartz type. The lamp is powered in a conventional manner from the external power supply through leads 32. Mechanism 34 is a conventional mechanism for adjusting the positioning and focusing of the lamp. The front wall of lamp housing 14 is provided with an aperture 36 therethrough surrounded by an inwardly projecting cylindrical sleeve portion 38 which aids in supporting a negative lens 40. Negative lens 40 is aligned on the optical axis 42 of the lamp 30 and of elliptical reflector 26 for extending the focal point of the reflector to condenser lens 94 (FIG. 6) and for increasing the magnification of the source. Likewise surrounding opening 36 is an outwardly projecting rectangular rib 44 dimensioned to abut a like-dimensioned rectangular projection 46 surrounding the light inlet of slide projector 20. Rib 44 and projection 46 aid in the positioning and aligning of the optical axis of the projector 20 with the optical axis 42 and in providing a light seal therebetween. The front wall of lamp housing 14 is further provided with an aperture 48 through which is journaled a shaft 50. Shaft 50 is supported for rotation in bearings 52 mounted in aligned openings in gear box 54. Said gear box is positioned and supported on the front wall of lamp housing portion 14 by means of suitable bolts (not shown) and spacers 56. A pair of blade shafts 58 and 60 are likewise mounted in bearings (not shown) in gear box 54. As more particularly shown in FIGS. 2 and 3, a drive gear 62 is mounted on shaft 50 while driven gears 64 and 66 are respectively mounted on blade shafts 58 and 60. Each of blade shafts 58 and 60 respectively supports a blade 68 and 70, the shape and function of which will be more particularly described below. A coil spring 72 (FIGS. 2 and 4) is mounted between the fixed front wall of lamp housing 14 and the rotatable shaft 50. The operation and function of this spring will likewise be discussed below.

Opening 48 in the front wall of lamp housing portion 14 provides communication to dissolver control housing portion 16. Shaft 50 is coupled through flexible coupling 74 to the output shaft 76 of a hysteresis clutch 78. The input shaft 80 of said hysteresis clutch is coupled through coupling 82 to the output shaft 84 of a motor 86. Motor 86 may be of the AC or DC variety but is designed to rotate output shaft 84, and therefore input shaft 80 of hysteresis clutch 78 at a constant speed on a continuous basis, when operative. The control signal for hysteresis clutch 78 and the power for motor 86 are passed from lines 23 and 25 through cables 88. A U-shaped support bracket 90 is mounted in dissolver control housing portion 16 for supporting motor 86 and hysteresis clutch 78.

Figure 5:
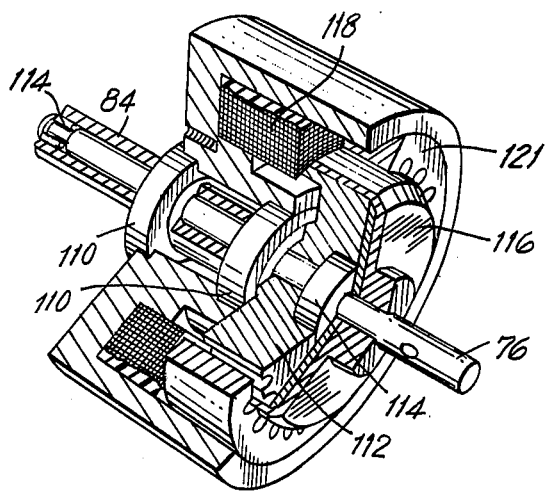
FIG. 5 is a sectioned perspective view of one embodiment of a prior art hysteresis clutch which may be utilized in the apparatus in accordance with the invention.
Figure 6:
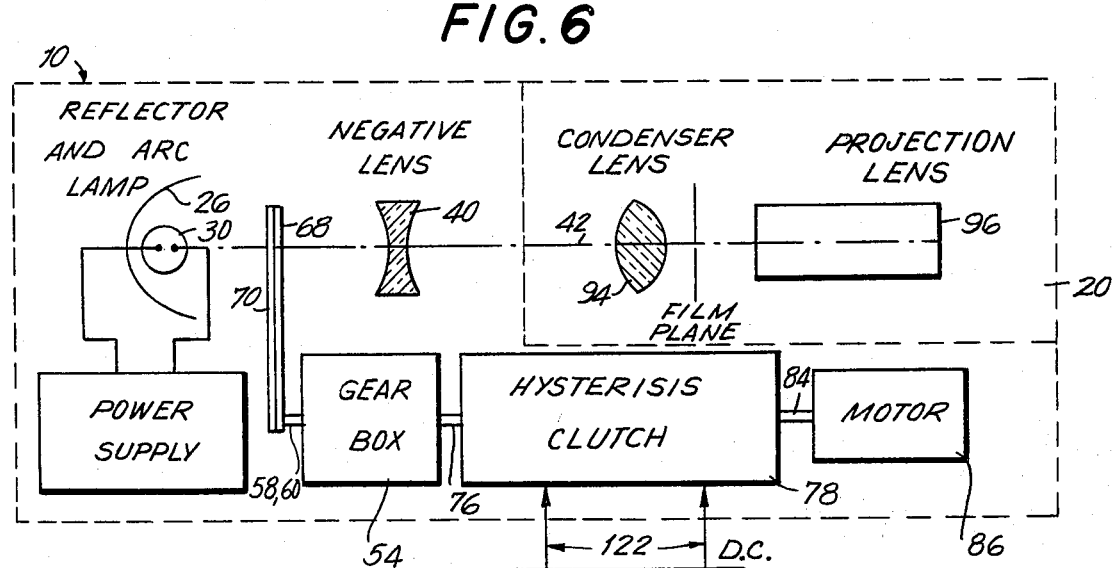
FIG. 6 is a block diagram of the apparatus in accordance with the invention.

The operation of the projector assembly 10 is more readily understood by reference to the schematic block diagram of FIG. 6, wherein like reference numerals as are used in FIGS. 1–4 are applied to like elements. As can be seen in FIG. 6, reflector 26, lamp 30 and negative lens 40 are all aligned on the optical axis. Within the projector 20, a condenser lens 94 and a projection lens 96 of conventional design are provided, likewise aligned on optical axis 42. Blades 68 and 70 are positioned so that when in completely overlapping position, all light from lamp 30 is intercepted and prevented from passing through negative lens 40 to the projector 20. This is the equivalent of an "off" position. As is more particularly seen in FIG. 3, each of the blades has an essentially V-shaped notch 98 on the inner face thereof, the respective arms of the V-shaped notches being curved and being symetrical abut the optical axis. As shaft 50 is rotated in the direction of arrow 100, the interaction of driving gear 62 with driven gear 66 causes said driven gear 66 to rotate in the direction of arrow 102, which in turn causes driven gear 64 to rotate in the direction of arrow 104. This rotation causes blades 68 and 70 to respectively move in the direction of arrows 106 and 108, the blades being illustrated in FIG. 3 in an intermediate position wherein relatively low intensity light is applied to negative lens 40. At the maximum open position, in one embodiment representing approximately 25 degrees of rotation by each blade, maximum light transmission is permitted past the blades to negative lens 40. The positioning of blades 68 and 70 is controlled by the interactive effect of coil spring 72 and hysteresis clutch 78. The operation of clutch 78 is more particularly understood by reference to FIGS. 5 and 7. The clutch illustrated in FIG. 5, by way of example, is a prior art clutch manufactured by American Precision Industries, Inc., Model FHYC Proportional Torque Control Clutch. Input shaft 84 is supported on bearings 110 and rotatably supports an input rotor 112. Output shaft 76 is supported on bearings 114 and rotatably supports a shell-shaped output rotor 116. A coil 118, to which a control signal from rectifier 120 is applied along lines 122, provides a controlled magnetic field to a salient pole stator 121. The pole structure of the stator is adapted to direct a multi-polar magnetic field through a concentrically mounted permanent magnet rotor. The rotor resists motion through the magnetic field, producing a value of torque which is independent of the operating speed. Because no physical contact occurs, the magnetic field is the sole influence on torque and controlled changes in applied voltage cause control changes in magnetic field strength and therefore controlled, predictable and repeatable values of output torque. This lack of physical contact also acts to insure a long service life with a minimum of maintenance and unkeep problems.

Figure 7:
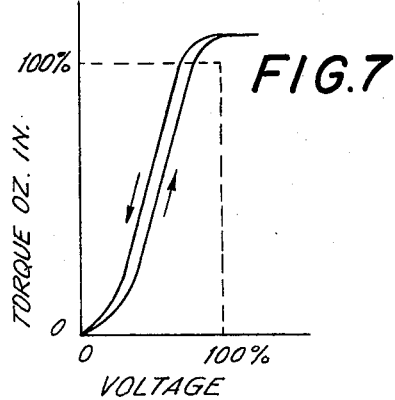
FIG. 7 is a typical curve of the developed output torque of the hysteresis clutch of FIG. 6 as a function of the voltage applied thereto.

FIG. 7 depicts a typical torque vs. input activation voltage curve for the clutch of FIG. 5 and shows that the response is essentially linear throughout most of the working range. In one embodiment, the system is designed to operate between a torque range of 0.4 oz. in. (at which blade displacement commences) and 4 oz. in. at which full blade displacement is achieved. Within this range, essentially linear variations in voltage result in essentially linear increases in output torque tending to displace the blades in the direction of arrows 106, 108 (FIG. 3) to increase the light intensity applied to the projector 20.

Figure 4:
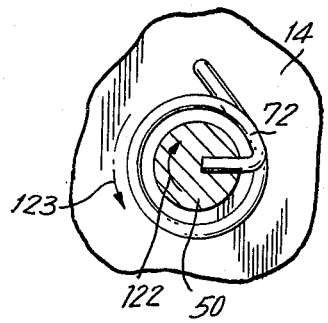

As noted above, shaft 50 is coupled to a fixed wall of lamp housing portion 14 by coil spring 72 which serves two purposes. First, coil spring 72 provides a counter-torque, the spring being designed to provide a linearly increasing counter-torque as the blades 68, 70 are separated by the rotation of shaft 50 in the direction of arrow 122 (FIG. 4). At each applied voltage level to the hysteresis clutch 78, an equilibrium between the applied torque transmitted through the clutch and the counter-torque of the spring is reached, resulting in the stable positioning of the blades, the blades being continuously positionable at any position between fully closed and fully open, dependent on the voltage applied to the hysteresis clutch. When the voltage applied to the hysteresis clutch is reduced or shut off completely, the coil spring 72 serves to return the blades to the fully closed position by rotating shaft 50 in the direction of arrow 123 (FIG. 4). A projector assembly 10 in accordance with the invention may be controlled by the voltage output signal of a programmer 124 which may be of conventional design utilized to control audio and incandescent lamp projector devices. The output of such programmer, in the embodiment depicted, is an A.C. signal applied along lines 126. Programmer 124 may control a plurality of projector assemblies 10 coupled through lines 128 and 130 to provide coordinated multimedia productions.

While the projector embodiment 10 depicted is a slide projector, the dissolver apparatus in accordance with the invention can be applied equally to any form of film projector. Further, other forms of blade, iris or shutter light valve may be used.

It will thus be seen that the objects set forth above, and those made apparent from the preceding description, are efficiently attained and, or since certain changes may be made in the above constructions without departing from the spirit and scope of the invention, it is intended that all matter contained in the above description or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An apparatus for controlling the light intensity output from an arc lamp comprising displaceable light valve means positionable in the light path of said arc lamp output, the intensity of the light passed along said path by said light valve means being dependent upon the position of said light valve means; magnetically coupled clutch means having an output operatively coupled to said light valve means for controlling the positioning thereof and an input; continuously rotating motor means operatively coupled to said clutch means input; counter-torque means coupled to said magnetic clutch means output for resisting the rotation thereof; and programmer means for selectively applying a control signal to said magnetic clutch means, said magnetic clutch means being adapted to magnetically couple said clutch means input and output to produce a torque, dependent upon said control signal, said torque tending to displace said light valve means at said clutch means output against the resistance of said counter-torque means, whereby said light valve is positioned at a position representative of said control signal, which position is representative of an equilibrium between the output torque transmitted by said magnetic clutch means and the counter-torque produced by said counter-torque means.

2. The apparatus as recited in claim 1, wherein the output torque of said clutch means is responsive to the voltage of the control signal.

3. The apparatus as recited in claim 2, wherein said clutch means is a hysteresis clutch means.

4. The apparatus as recited in claim 3, wherein said counter-torque means comprises spring means biased by the rotation of said hysteresis clutch means output, said spring means returning said light valve means to a selected original rest position on reduction of the voltage of said control signal to a predetermined level.

5. The apparatus as recited in claim 4, wherein said light valve means comprises a pair of blades, means pivotably mounting said pair of blades for overlapping, opposed, counter-rotation essentially symmetrical with said light path, each of said blades having a notch symmetrical with said light path formed in an inner side thereof, said notches being positioned relative to each other to form an aperture in registration with the light path, the dimension of which increases as the blades are pivotably displaced in opposite directions from an overlapping position, and means for coordinately pivoting said blades in opposite directions in response to the displacement of said clutch means output.

6. The apparatus as recited in claim 1, wherein said light valve means comprises a pair of blades, means pivotably mounting said pair of blades for overlapping, opposed, counter-rotation essentially symmetrical with said light path, each of said blades having a notch symmetrical with said light path formed in an inner side thereof, said notches being positioned relative to each other to form an aperture in registration with the light path, the dimension of which increases as the blades are pivotably displaced in opposite directions from an overlapping position, and means for coordinately pivoting said blades in opposite directions in response to the displacement of said clutch means output.

7. The apparatus as recited in claim 5 or 6, wherein said clutch means output includes a rotatably shaft, said means for coordinately pivoting said blade means comprising a drive gear mounted on said clutch means output shaft and driven gears operatively coupled to said drive gear for the coordinate rotation thereof and respectively coupled to one of said blade means for the displacement thereof.

8. The apparatus as recited in claim 1, 2, 3, 4, or 5, and including projector means positioned in said light path with said light valve means intermediate said lamp means and said projector means, whereby the light intensity transmitted to said projector means is responsive to said control signal.

9. The apparatus as recited in claim 8, wherein said projector means is a slide projector means.

10. The apparatus as recited in claim 8, wherein said projector means is a film projector means.

11. The apparatus as recited in claim 8, including lamp housing means enclosing said light valve means and said lamp means and dissolve housing means enclosing said clutch means and motor means, said dissolve housing means being positioned forwardly of said lamp housing means in the direction of said light path and below said light path and defining shelf means for the support of said projector means.

12. The apparatus as recited in claim 8, including a plurality of said apparatus, sharing a common programmer means for the coordinate control of said programmer means.

13. The apparatus as recited in claim 1, 2, 3, 4 or 5, wherein said clutch means is adapted to produce a torque essentially linearly dependent on said control signal in the operative range thereof, and said counter-torque means being adapted to produce a counter-torque which linearly varies with the displacement of said light valve means.

* * * * *